(12) United States Patent
Domahidy et al.

(10) Patent No.: US 7,703,786 B1
(45) Date of Patent: Apr. 27, 2010

(54) CROWN-HOLDING HEAD CAP

(75) Inventors: Steve Domahidy, Denver, CO (US);
Chris Sugai, North Hollywood, CA (US)

(73) Assignee: Niner, Inc., North Hollywood, CA (US)

( * ) Notice: Subject to any disclaimer, the term of this patent is extended or adjusted under 35 U.S.C. 154(b) by 888 days.

(21) Appl. No.: 11/350,582

(22) Filed: Feb. 8, 2006

(51) Int. Cl.
*B62K 21/12* (2006.01)
*B62K 21/18* (2006.01)

(52) U.S. Cl. .................. 280/280; 280/276; 280/279; 74/551.1

(58) Field of Classification Search ............... 280/276, 280/279, 280; 74/551.1, 551.8, 551.9
See application file for complete search history.

(56) References Cited

U.S. PATENT DOCUMENTS

| | | | | |
|---|---|---|---|---|
| 2,356,012 A | * | 8/1944 | Smith | 215/328 |
| 5,094,363 A | * | 3/1992 | Monahan et al. | 222/131 |
| 5,445,366 A | * | 8/1995 | Shih et al. | 267/140.13 |
| 6,182,464 B1 | * | 2/2001 | Mamich | 62/316 |
| 6,523,847 B1 | * | 2/2003 | Chien | 280/279 |
| 6,669,219 B2 | * | 12/2003 | Turner et al. | 280/276 |
| 2006/0038376 A1 | * | 2/2006 | Okajima et al. | 280/276 |
| 2006/0055146 A1 | * | 3/2006 | Ueno | 280/280 |

* cited by examiner

*Primary Examiner*—Lesley Morris
*Assistant Examiner*—Marc A Scharich
(74) *Attorney, Agent, or Firm*—Alleman Hall McCoy Russell & Tuttle LLP

(57) ABSTRACT

The head cap of a bicycle headset is configured with a shoulder sized to releasably receive an uncrimped bottle crown to cover a headset adjustment bolt in a decorative fashion.

10 Claims, 2 Drawing Sheets

CROWN-HOLDING HEAD CAP

BACKGROUND

Bicycle headsets permit steering rotation of a bicycle fork with respect to a bicycle frame. The bicycle headset includes a headset adjustment bolt, which is usually visible directly in front of a rider.

SUMMARY

A head cap for a bicycle headset is provided. The head cap includes a boss, a pressure surface, an annular recess, a shoulder, and a bolt head recess. The boss has a boss diameter sized to fit within an opening of a bicycle stem. The pressure surface is located above the boss and has a pressure diameter sized to engage with a top of the bicycle stem. The annular recess is located above the pressure surface and has a recess diameter that is less than the pressure diameter. The shoulder is located above the annular recess and has a shoulder diameter that is greater than the recess diameter. The shoulder diameter is sized such that an uncrimped bottle crown sized to cap a bottle fits over the shoulder. In this way, the shoulder securely holds the uncrimped bottle crown in place without additional fastening. The bolt head recess is located interior and sufficiently below an upper surface of the shoulder. As such, a bolt head of a headset adjustment bolt fits below the uncrimped bottle crown fit over the shoulder. The bolt head recess is sized to prevent complete admittance of such a bolt head through the head cap so that the headset adjustment bolt forces the pressure surface against the bicycle stem when the headset adjustment bolt is tightened.

DETAILED DESCRIPTION

Figure 1:
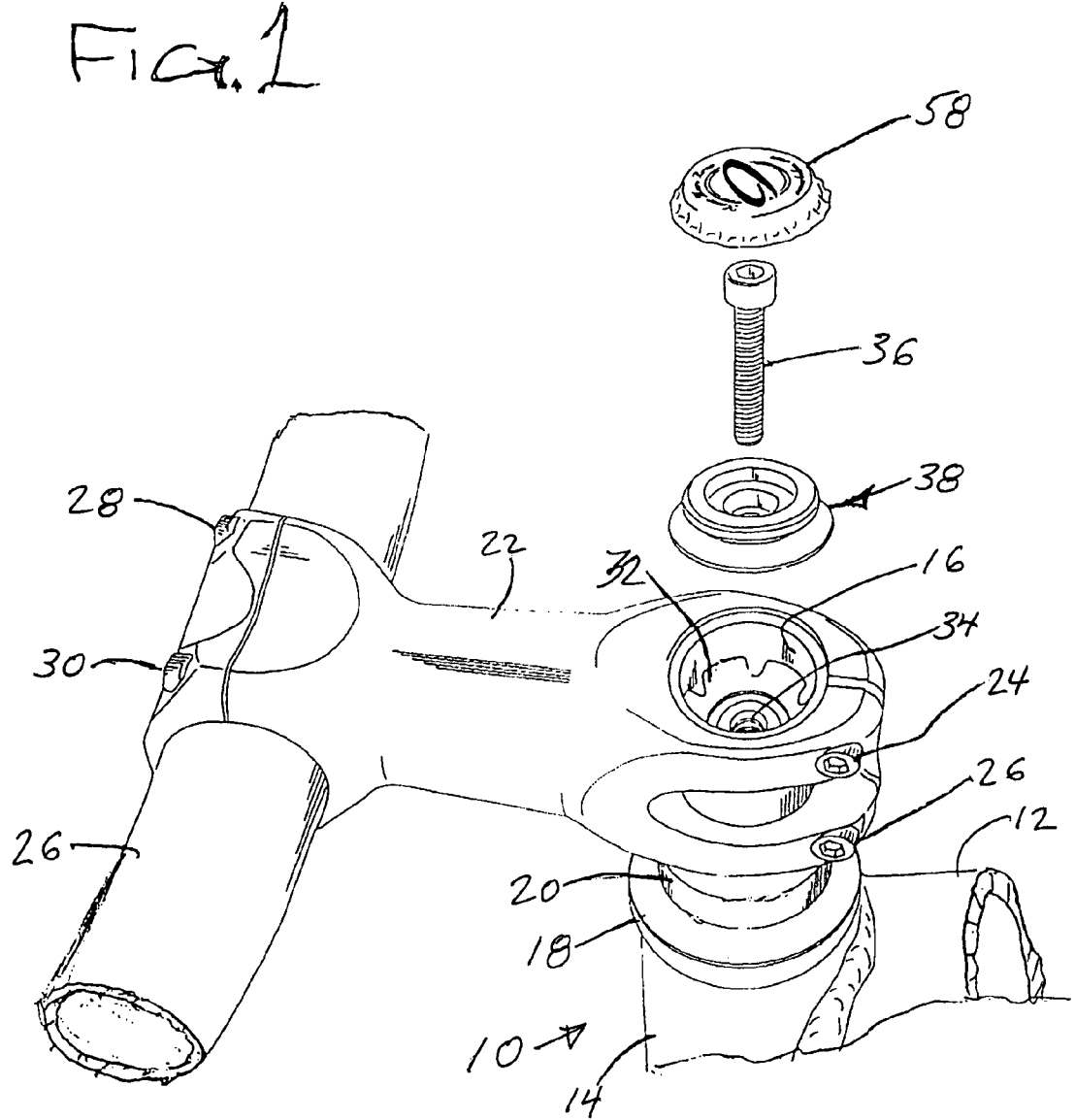
FIG. 1 is a perspective view of a headset of a bicycle, with a head cap, uncrimped bottle crown, and a headset adjusting bolt shown in projected position and other parts broken away.

The part of the bicycle frame with which the crown-holding cap of this invention is utilized is generally indicated at 10 in FIG. 1. The part of the bicycle frame which is illustrated includes top tube 12 and head tube 14. In diamond framed bicycle structure, the top tube extends from the head tube to the seat post. In other types of the bicycle frame structures, the top tube 12 is absent, but is not necessary for utilization of this invention. The head tube 14 is generally upright, but with slight rearward slope to provide camber for the steering fork post. The steering fork carries the front wheel and extending upward as part of the steering fork is the steering fork post. The steering fork post extends up through head tube 14. There are upper and lower headset bearings to rotatably support the fork post in the head tube. Upper headset bearing race 18 is seen.

Spacer 20 engages on the top of the upper headset bearing race 18. With the stem clamp bolts 24 and 26 loose, adjustment of loading on the headset bearings is accomplished by pulling up on fork tube 16 with respect to pressing down on the stem. The stem pushes down through spacer 20 onto the upper headset bearing race 18.

Figure 3:
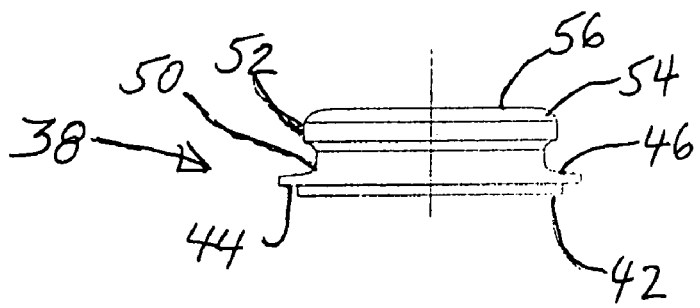
FIG. 3 is a side-elevational view of the head cap of FIG. 1.
Figure 4:
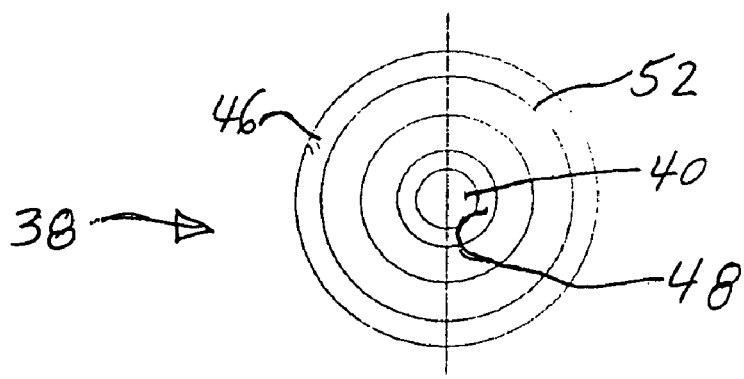
FIG. 4 is a plan view of the head cap of FIG. 1.
Figure 5:
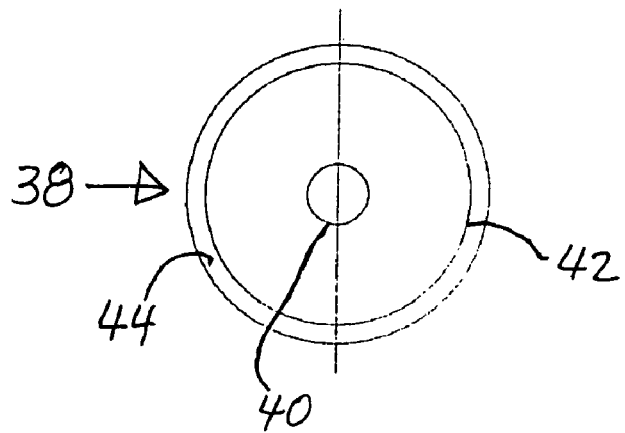
FIG. 5 is a bottom view of the head cap of FIG. 1.

This adjustment is obtained by means of star nut 32. Star nut 32 engages on the interior of fork tube 16. Star nut 32 has a threaded hole 34 therein. Headset adjustment bolt 36 engages in threaded hole 34. The adjustment bolt 36 engages down through the head cap 38. The head cap 38 is shown in more detail in FIGS. 3, 4 and 5. When adjustment is complete, stem 22 is clamped around the fork tube 16 by clamp bolts 24 and 26 to lock the bearing adjustment. The forward end of the stem 22 carries handle bar structure 26, which is clamped in position by means of clamp bolts 28 and 30.

Head cap 38, which engages on the top of stem 22, is a figure of revolution around a central axis. At the center there is a bolt hole 40 configured to pass the adjustment bolt 36. The bottom of head cap 38 has a boss 42 engaged in the opening in the top of the stem 22 which receives the fork tube 16. Above the boss is a pressure surface 44 which engages on the top of stem 22. Thus, the head cap is held centered over the opening in the stem which receives the fork tube 16. The pressure surface 44 is under face 46.

Looking at the head cap 38 from the top, there is a bolt head recess 48, which receives the head of adjustment bolt 36. With the tightening of the adjustment bolt, it can be seen that the stem 22 is forced downward and the fork tube 16 is pulled up. This increases the loading on the headset bearings. When the proper bearing loading is achieved, the clamp bolts 24 and 26 are tightened so that it maintains this position.

Above the face 46, there is an annular recess 50 (see FIG. 3), and above the annular recess is a shoulder 52. The upper part of the shoulder 52 has a rounded shoulder transition 54 to the top surface 56. The upper exterior of the head cap 38 is about the same configuration as a bottle, which is to be closed by a bottle crown.

Figure 2:
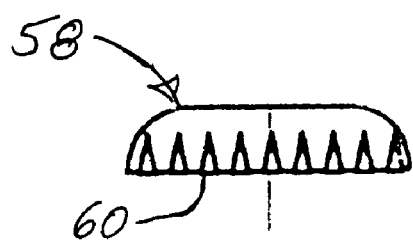
FIG. 2 is a side-elevational view of the uncrimped bottle crown of FIG. 1.

An uncrimped bottle crown 58 is shown in FIGS. 1 and 2. Its skirt is more open than after crimping. Its skirt has a plurality of indentations 60 which are formed during manufacture to aid in the subsequent crimping when used to close a beverage bottle. The uncrimped bottle crown 58 is configured such that it will engage on the head cap 38 and be fairly strongly engaged thereon without crimping. The uncrimped bottle crown 58 seals against water, dirt and other types of contaminants. In addition, the uncrimped bottle crown 58 serves as a decor item. Since the bottle crown 58 is not crimped in place, it may be removed for headset adjustment or for replacement by another uncrimped bottle crown of other decor.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A head cap for a bicycle headset, comprising:
   a bottom pressure surface sized and configured to engage a stem of a bicycle;
   an adjustment bolt passage to receive a headset adjustment bolt configured to force the bottom pressure surface against the stem when the headset adjustment bolt is tightened;
   a shoulder sized and configured to receive an uncrimped bottle crown to cover the shoulder and the headset adjustment bolt; and
   an annular recess intermediate the bottom pressure surface and the shoulder.

2. The head cap of claim 1, wherein the head cap is a body of revolution about an axis.

3. The head cap of claim 1, wherein the adjustment bolt passage includes a bolt head recess below the shoulder, the bolt head recess being sized, positioned, and configured to receive a head of the headset adjustment bolt below a top surface of the shoulder when the headset adjustment bolt is engaged to tighten headset bearings.

4. The head cap of claim 1, wherein the shoulder includes an upper surface and an annular rounded transition to the upper surface.

5. The head cap of claim 1, further comprising a boss sized and configured to penetrate a steering fork tube opening of the stem to center the head cap relative to the steering fork tube opening of the stem.

6. The head cap of claim 1, wherein the shoulder is positioned sufficiently high so that the uncrimped bottle crown does not engage upon a head of the headset adjustment bolt.

7. A head cap for a bicycle headset, the head cap comprising:
- a boss having a boss diameter sized to fit within an opening of a bicycle stem;
- a pressure surface located above the boss and having a pressure diameter sized to engage with a top of the bicycle stem;
- an annular recess located above the pressure surface and having a recess diameter less than the pressure diameter;
- a shoulder located above the annular recess and having a shoulder diameter greater than the recess diameter bottle so that an uncrimped bottle crown sized to cap a bottle fits over the shoulder such that the shoulder securely holds the uncrimped bottle crown in place without additional fastening; and
- a bolt head recess located interior and sufficiently below an upper surface of the shoulder such that a bolt head of a headset adjustment bolt fits below the uncrimped bottle crown fit over the shoulder, the bolt head recess sized to prevent complete admittance of the bolt head through the head cap so that the headset adjustment bolt forces the pressure surface against the bicycle stem when the headset adjustment bolt is tightened.

8. The head cap of claim 7, wherein the recess diameter is less than the boss diameter.

9. The head cap of claim 7, further comprising an adjustment bolt passage to allow penetration of the headset adjustment bolt through the head cap to a fork tube anchor secured within a fork tube of a bicycle fork.

10. A bicycle headset, comprising:
- an upper bearing race configured to be fit to a head tube of a bicycle frame;
- a fork tube anchor configured to be secured within a fork tube of a bicycle fork, the fork tube anchor including a threaded attachment;
- a threaded adjustment bolt configured to adjustably engage the threaded attachment of the fork tube anchor; and
- a head cap including a shoulder and a bolt head recess, the shoulder sized such that the shoulder securely holds an uncrimped bottle crown in place without additional fastening to cover the head cap and threaded adjustment bolt, the bolt head recess located interior and sufficiently below an upper surface of the shoulder such that a bolt head of the threaded adjustment bolt fits below the uncrimped bottle crown fit over the shoulder, the bolt head recess sized to prevent complete admittance of the bolt head of the threaded adjustment bolt through the head cap so that the threaded adjustment bolt forces the head cap against a bicycle stem to apply pressure to the upper bearing race when the threaded adjustment bolt is screwed into the threaded attachment of the fork tube anchor.

\* \* \* \* \*

UNITED STATES PATENT AND TRADEMARK OFFICE
CERTIFICATE OF CORRECTION

| | |
|---|---|
| PATENT NO. | : 7,703,786 B1 |
| APPLICATION NO. | : 11/350582 |
| DATED | : April 27, 2010 |
| INVENTOR(S) | : Steve Domahidy and Chris Sugai |

Page 1 of 1

It is certified that error appears in the above-identified patent and that said Letters Patent is hereby corrected as shown below:

In Column 3 line 27:

At the end of line 27, delete "bottle".

Signed and Sealed this

Twenty-seventh Day of July, 2010

David J. Kappos
*Director of the United States Patent and Trademark Office*